(12) United States Patent
Ferrier

(10) Patent No.: US 11,845,551 B2
(45) Date of Patent: Dec. 19, 2023

(54) METHODS AND SYSTEM FOR ESTIMATING PERCENTAGE TORQUE PRODUCED BY A PROPULSOR CONFIGURED FOR USE IN AN ELECTRIC AIRCRAFT

(71) Applicant: BETA AIR, LLC, South Burlington, VT (US)

(72) Inventor: Lochie Ferrier, Sydney (AU)

(73) Assignee: BETA AIR, LLC, South Burlington, VT (US)

( * ) Notice: Subject to any disclaimer, the term of this patent is extended or adjusted under 35 U.S.C. 154(b) by 470 days.

(21) Appl. No.: 17/186,079

(22) Filed: Feb. 26, 2021

(65) Prior Publication Data

US 2022/0274713 A1   Sep. 1, 2022

(51) Int. Cl.

| | |
|---|---|
| *G06F 17/00* | (2019.01) |
| *B64D 31/06* | (2006.01) |
| *G05B 13/04* | (2006.01) |
| *B64D 27/24* | (2006.01) |
| *G07C 5/08* | (2006.01) |
| *G05B 13/02* | (2006.01) |

(52) U.S. Cl.
CPC ............. *B64D 31/06* (2013.01); *B64D 27/24* (2013.01); *G05B 13/0265* (2013.01); *G05B 13/042* (2013.01); *G07C 5/0808* (2013.01)

(58) Field of Classification Search
CPC .... B64D 31/06; B64D 27/24; G05B 13/0265; G05B 13/042; G07C 5/0808
USPC ........................................................... 701/3
See application file for complete search history.

(56) References Cited

U.S. PATENT DOCUMENTS

| 4,150,566 A | 4/1979 | Loebel |
| 6,879,885 B2 * | 4/2005 | Driscoll ............... B64D 31/06 |
| | | 73/527 |

(Continued)

FOREIGN PATENT DOCUMENTS

| CN | 103979119 A | 8/2014 |
| EP | 0407179 A1 | 1/1991 |
| EP | 1914135 A1 | 4/2008 |

OTHER PUBLICATIONS

Aircraft Hybrid-Electric Propulsion (Year: 2021).*

*Primary Examiner* — Ronnie M Mancho
(74) *Attorney, Agent, or Firm* — CALDWELL INTELLECTUAL PROPERTY LAW (57) ABSTRACT

A system for estimating percentage torque produced by a propulsor configured for use in an electric aircraft, the system including a propulsor, the propulsor configured to generate output torque. The system including a sensor, the sensor configured to detect the output torque and generate an output torque datum. The system including a flight controller including a computing device configured to receive an output torque datum, receive an ideal propulsor model, the ideal propulsor model including at least a performance parameter, generate a model torque datum, including a model torque datum threshold, as a function of the at least a performance parameter, generate a percentage datum as a function of the output torque datum and model torque datum, and determine, at least an obstruction datum correlated to the torque percentage datum, and display torque percentage datum and the at least an obstruction datum.

20 Claims, 6 Drawing Sheets

(56) References Cited

U.S. PATENT DOCUMENTS

| | | | | |
|---|---|---|---|---|
| 6,981,423 | B1* | 1/2006 | Discenzo | G01L 3/12 |
| | | | | 73/800 |
| 7,801,695 | B2 | 9/2010 | Moeckly et al. | |
| 8,132,763 | B2* | 3/2012 | Schievelbusch | B64D 45/0005 |
| | | | | 244/99.3 |
| 8,909,453 | B2* | 12/2014 | Wendelsdorf | G01M 5/0016 |
| | | | | 701/99 |
| 9,102,419 | B2* | 8/2015 | Green | B64C 27/008 |
| 9,334,064 | B2* | 5/2016 | Takasaki | B64C 27/04 |
| 10,611,491 | B2* | 4/2020 | Kono | B64C 27/12 |
| 11,225,321 | B1* | 1/2022 | Townsend | B64C 13/503 |
| 11,254,219 | B2* | 2/2022 | Clark | G05D 1/0055 |
| 11,365,001 | B1* | 6/2022 | Woodall | B64C 29/0033 |
| 11,435,761 | B1* | 9/2022 | Wiegman | B64C 29/0033 |
| 11,584,541 | B2* | 2/2023 | List | B64C 39/024 |
| 11,592,791 | B1* | 2/2023 | Wiegman | G05D 1/0072 |
| 2018/0127104 | A1* | 5/2018 | Kobayashi | B64D 27/24 |
| 2020/0063599 | A1* | 2/2020 | Waun | B64D 27/02 |
| 2020/0277064 | A1* | 9/2020 | Thomassin | B64D 43/00 |
| 2020/0307390 | A1* | 10/2020 | Clark | B64D 31/00 |
| 2020/0339268 | A1* | 10/2020 | Mark | B64D 31/06 |
| 2020/0362722 | A1* | 11/2020 | Manoukian | F02C 9/28 |
| 2021/0339882 | A1* | 11/2021 | Ferrier | B64D 27/24 |
| 2021/0354837 | A1* | 11/2021 | Mark | B64D 31/00 |
| 2021/0354840 | A1* | 11/2021 | Mark | B64D 27/02 |
| 2022/0169375 | A1* | 6/2022 | Ouellet | B64C 27/78 |
| 2022/0169377 | A1* | 6/2022 | Bustamante | B64C 27/06 |
| 2022/0171409 | A1* | 6/2022 | Ouellet | G05D 1/0808 |
| 2022/0274713 | A1* | 9/2022 | Ferrier | G05B 13/0265 |
| 2022/0315206 | A1* | 10/2022 | Townsend | B64C 13/04 |
| 2022/0413514 | A1* | 12/2022 | Moy | G06T 19/006 |
| 2023/0078803 | A1* | 3/2023 | Wiegman | G08G 5/0013 |
| | | | | 701/3 |

* cited by examiner

METHODS AND SYSTEM FOR ESTIMATING PERCENTAGE TORQUE PRODUCED BY A PROPULSOR CONFIGURED FOR USE IN AN ELECTRIC AIRCRAFT

FIELD OF THE INVENTION

The present invention generally relates to the field of electric aircraft. In particular, the present invention is directed to estimating percentage torque produced by a propulsor configured for use in an electric aircraft.

BACKGROUND

In electrically propelled vehicles, such as an electric vertical takeoff and landing (eVTOL) aircraft, it is essential to maintain the integrity of the aircraft until safe landing. In some flights, a component of the aircraft may experience a malfunction or failure which will put the aircraft in an unsafe mode which will compromise the safety of the aircraft, passengers and onboard cargo. A method and system for estimating propulsor output is a necessary component of a safe eVTOL aircraft, and aircraft in general to assess maneuverability and capabilities of aircraft through flight envelope.

SUMMARY OF THE DISCLOSURE

In an aspect a system for estimating percentage torque produced by a propulsor configured for use in an electric aircraft, the system including a propulsor, the propulsor configured to generate output torque. The system including a sensor, the sensor configured to detect the output torque and generate an output torque datum. The system including a flight controller, the flight controller including a computing device, the computing device configured to receive an output torque datum, receive an ideal propulsor model, the ideal propulsor model including at least a performance parameter, generate a model torque datum, including a model torque datum threshold, as a function of the at least a performance parameter, generate a percentage datum as a function of the output torque datum and model torque datum, and determine, as a function of the determination, at least an obstruction datum correlated to the torque percentage datum and display output torque datum and the at least an obstruction datum.

In another aspect A method of estimating the percentage torque produced by a propulsor configured for use in an electric aircraft, the method including receiving a model of an ideal propulsor, wherein the model includes performance parameters. The model may include a model torque datum. The model includes a model torque datum threshold. The method includes detecting output torque produced at an actual propulsor, wherein the actual propulsor is mechanically and electrically coupled to at least a portion of the electric aircraft. The actual propulsor may include a sensor configured to detect output torque. The method includes generating an output torque datum as a function of the detection of the output torque, generating a torque percentage datum as a function of the output torque datum and model torque datum, and determining an obstruction datum correlated to the torque percentage datum. The method includes displaying the torque percentage datum and obstruction datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for estimating percentage torque produced by a propulsor configured for use in an electric aircraft. In an embodiment, the disclosure may include a sensor, the sensor configured to detect the output torque and generate an output torque datum. The system may include a flight controller, the flight controller including a computing device, the computing device configured to receive an output torque datum, receive an ideal propulsor model, the ideal propulsor model including at least a performance parameter, generate a model torque datum, including a model torque datum threshold, as a function of the at least a performance parameter, generate a percentage datum as a function of the output torque datum and model torque datum, and determine, as a function of the determination, at least an obstruction datum correlated to at least a performance parameter. The system may display torque percentage datum and the at least an obstruction datum.

Figure 1:
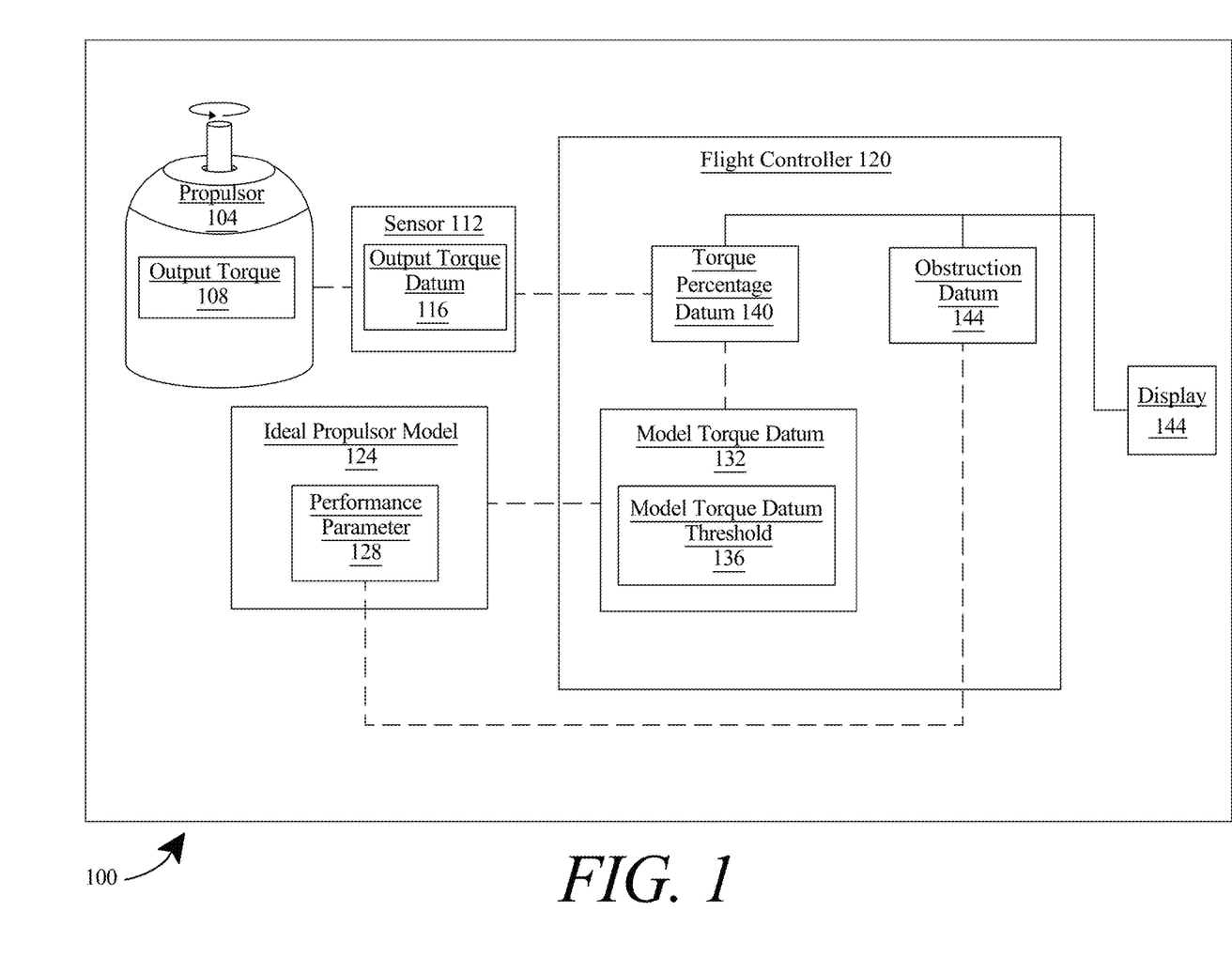
FIG. 1 is an illustrative embodiment of a system for estimating torque produced by a propulsor configured for use in an electric aircraft in block diagram form.

Referring now to FIG. 1, exemplary system 100 for estimating percentage torque produced by a propulsor configured for use in an electric aircraft is illustrated. System 100 includes propulsor 104. Propulsor 104 is configured to generate output torque 108. "Torque", for the purposes of this disclosure is the rotational equivalent of linear force. It is also referred to as the moment, moment of force, rotational force or turning effect, depending on the field of study. The concept originated with the studies by Archimedes of the usage of levers. Just as a linear force is a push or a pull, a torque can be thought of as a twist to an object around a specific axis. Another definition of torque is the product of the magnitude of the force and the perpendicular distance of the line of action of a force from the axis of rotation. In three dimensions, the torque is a pseudovector; for point particles, it is given by the cross product of the position vector (distance vector) and the force vector. The magnitude of torque of a rigid body depends on three quantities: the force applied, the lever arm vector connecting the point about which the torque is being measured to the point of force application, and the angle between the force and lever arm vectors.

More specifically, propulsor 104 may be an electrical machine that converts electrical energy into mechanical energy, like an electric motor. Most electric motors operate through the interaction between the motor's magnetic field and electric current in a wire winding to generate force in the form of torque applied on the motor's shaft. Electric motors can be powered by direct current (DC) sources, such as from batteries, motor vehicles or rectifiers, or by alternating current (AC) sources, such as a power grid, inverters or electrical generators. An electric generator is mechanically identical to an electric motor, but operates with a reversed flow of power, converting mechanical energy into electrical energy.

Propulsor 104 may include a plurality of individual propulsors or integrated propulsors such as an electric motor mechanically and electrically coupled to a fluid manipulating device which may be mechanically coupled to at least a portion of electric aircraft. The propulsor 104 may include an electric motor. The propulsor 104 may include a propeller. At least a portion of an electric aircraft may include at least a propulsor. A propulsor, as used herein, is a component or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. The more air pulled behind an aircraft, the greater the force with which the aircraft is pushed forward. Propulsor may include any device or component that consumes electrical power on demand to propel an electric aircraft in a direction or other vehicle while on ground or in-flight.

In an embodiment, at least a portion of the aircraft may include a propulsor, the propulsor may include a propeller, a blade, or any combination of the two. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of the propellers may, for example, be fixed, manually variable to a few set positions, automatically variable (e.g. a "constant-speed" type), or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates.

In an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 1, system 100 includes sensor 112. Sensor 112 is configured to detect the output torque 108 produced by propulsor 104. Sensor 112 may be integrated into propulsor 104, a portion thereof, or any subcomponent thereof. Sensor 108 may include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sin c function, or pulse width modulated signal. Control datum 112 may include circuitry, computing devices, electronic components or a combination thereof that translates into at least an electronic signal configured to be transmitted to another electronic component.

With continued reference to FIG. 1, sensor 112 generates output torque datum 116. An "output torque datum", for the purposes of this disclosure, is an element of data that represents a physical value, electrical value, or combination thereof. In a non-limiting embodiment, sensor 112 may detect the torque produced by propulsor 104 and translate that torque value into an electrical signal that represents that value for use in later processing or steps consistent with the entirety of this disclosure. Sensor 108 may include a motion sensor. A "motion sensor", for the purposes of this disclosure, is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 112 may include, torque sensor, gyroscope, accelerometer, torque sensor, magnetometer, inertial measurement unit (IMU), pressure sensor, force sensor, proximity sensor, displacement sensor, vibration sensor, among others. Sensor 112 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 1, system 100 includes flight controller 120. Flight controller 120 is communicatively coupled to a pilot input control and configured to receive output torque datum 116 from sensor 112. A "flight controller", for the purposes of this disclosure, is a component or grouping of components that control trajectory of the electric aircraft by taking in signals from a pilot and output signals to at least a propulsor and other portions of the electric aircraft like control surfaces to adjust trajectory. Flight controller may mix, refine, adjust, redirect, combine, separate, or perform other types of signal operations to translate pilot desired trajectory into aircraft maneuvers. Flight controller, for example, may take in output torque datum 116 from sensor 112, the signa may be sent to flight controller, which performs any number or combinations of operations on those signals, then sends out output signals to any number of aircraft components that work in tandem or independently to maneuver the aircraft in response to the pilot input. Flight controller may condition signals such that they can be sent and received by various components throughout the electric aircraft.

Additionally, flight controller may include and/or communicate with any computing device, including without limitation a microcontroller, microprocessor, digital signal processor (DSP) and/or system on a chip (SoC). Flight controller may be programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Flight controller may be designed and configured to operate electronic aircraft via fly-by-wire. Flight controller is communicatively coupled to each propulsor; as used herein, flight controller is communicatively coupled to each propulsor where flight controller is able to transmit signals to each propulsor and each propulsor is configured to modify an aspect of propulsor behavior in response to the signals. As a non-limiting example, flight controller may transmit signals to a propulsor via an electrical circuit connecting flight controller to the propulsor; the circuit may include a direct conductive path from flight controller to propulsor or may include an isolated coupling such as an optical or inductive coupling. Alternatively, or additionally, flight controller may communicate with a propulsor of plurality of propulsors 104*a-n* using wireless communication, such as without limitation communication performed using electromagnetic radiation including optical and/or radio communication, or communication via magnetic or capacitive coupling. Vehicle controller may be fully incorporated in an electric aircraft containing a propulsor and may be a remote device operating the electric aircraft remotely via wireless or radio signals, or may be a combination thereof, such as a computing device in the aircraft configured to perform some steps or actions described herein while a remote device is configured to perform other steps. Persons skilled in the art will be aware, after reviewing the entirety of this disclosure, of many different forms and protocols of communication that may be used to communicatively couple flight controller to propulsors. Persons skilled in the art, upon reviewing the entirety of this disclosure, will be aware of various ways to monitor resistance levels and apply resistance to linear thrust control, as used and described herein.

Flight controller 120 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Fall back flight control system 100 may include a single computing device operating independently, or may include two or more computing device operating in concert, in parallel, sequentially or the like; two or more computing devices may be included together in a single computing device or in two or more computing devices. Flight controller 120 may interface or communicate with one or more additional devices as described below in further detail via a network interface device. Network interface device may be utilized for connecting flight controller 120 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Flight controller 120 may include but is not limited to, for example, a computing device or cluster of computing devices in a first location and a second computing device or cluster of computing devices in a second location. Fall back flight control system 100 may include one or more computing devices dedicated to data storage, security, distribution of traffic for load balancing, and the like. Flight controller 120 may distribute one or more computing tasks as described below across a plurality of computing devices of computing device, which may operate in parallel, in series, redundantly, or in any other manner used for distribution of tasks or memory between computing devices. Flight controller 120 may be implemented using a "shared nothing" architecture in which data is cached at the worker, in an embodiment, this may enable scalability of flight controller 120 and/or computing device.

Flight controller 120 may be designed and/or configured to perform any method, method step, or sequence of method steps in any embodiment described in this disclosure, in any order and with any degree of repetition. For instance, flight controller 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 120 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Flight controller 120, as well as any other component present within disclosed systems, as well as any other components or combination of components may be connected to a controller area network (CAN) which may interconnect all components for signal transmission and reception. Flight controller 120 is configured to generate an output datum 120 as a function of the control datum 112. Output datum 120 may include an electrical signal consistent with the description of electrical signals regarding control datum 116. Output datum 120 includes an electrical signal configured to be transmitted to at least a portion of the aircraft, namely an actuator mechanically coupled to at least a portion of the aircraft that manipulates a fluid medium to change an aircraft's pitch, roll, yaw, or throttle.

Still referring to FIG. 1, flight controller 120 is configured to receive an ideal propulsor model 124, the ideal propulsor model 124 including at least a performance parameter 128. Ideal propulsor model 124 may be a set of data corresponding to a virtual propulsor's torque output. Ideal propulsor model 124 may be a computer program or computer application that represents propulsor torque performance given a certain set of conditions. This set of conditions includes performance parameter 128. Performance parameters 128 may be environmental such as air density, air speed, true airspeed, relative airspeed, temperature, humidity level, and weather conditions, among others. Performance parameter 128 may include propulsor parameters that define a propulsors physical characteristics and/or specifications such as material properties, electrical characteristics, propulsor type, weight, geometry, speed, and revolutions per minute (rpm), among others. Performance parameter 128 may include velocity and/or speed in a plurality of ranges and direction such as vertical speed, horizontal speed, changes in angle or rates of change in angles like pitch rate, roll rate, yaw rate, or a combination thereof, among others.

Flight control 120 is configured to generate model torque datum 132 including model torque datum threshold 136. A "model torque datum", for the purposes of this disclosure, is an element of data that represents an ideal torque output form an ideal propulsor model. One of ordinary skill in the art, after reviewing the entirety of this disclosure, would appreciate that model torque datum 132 is the torque output an ideal virtual torque data from a perfect propulsor given performance parameter 128 of a plurality of performance parameters. For example, in a nonlimiting embodiment, ideal propulsor model 124 may include performance parameter 128 including air density, propulsor type, electrical input, and rpm. Model torque datum 132 may be generated by flight controller 120 to represent what a perfect (ideal) propulsor would output as torque given those performance parameters 128. Model torque datum threshold 136 includes a range of acceptable torque values associated with model torque datum 132. Model torque datum threshold 136 may be a minimum and maximum torque value associated with model torque datum 132. Flight controller 120 may be configured to detect if output torque datum is outside model torque datum threshold 136, which may then trigger detection of datums consistent with this disclosure.

Flight controller 120 may utilize stored data to generate model torque datum 132. Stored data may be past torque outputs related to performance parameters 128 desired for the instant model in an embodiment of the present invention. Stored data may be input by a user, pilot, support personnel, or another. Stored data may include algorithms and machine-learning processes that may generate model torque datum 132 considering at least a performance parameter 132. The algorithms and machine-learning processes may be any algorithm or machine-learning processes as described herein. Training data may be columns, matrices, rows, blocks, spreadsheets, books, or other suitable datastores or structures that contain correlations between past torque outputs to performance parameters. Training data may be any training data as described below. Training data may be past measurements detected by any sensors described herein or another sensor or suite of sensors in combination. Training data may be detected by onboard or offboard instrumentation designed to detect output torque and performance parameters as described herein. Training data may be uploaded, downloaded, and/or retrieved from a server prior to flight. Training data may be generated by a computing device that may simulate torque outputs and correlated performance parameters suitable for use by the flight controller 120 in an embodiment of the present invention. Flight controller 120 and/or another computing device as described in this disclosure may train one or more machine-learning models using the training data as described in this disclosure. Training one or more machine-learning models consistent with the training one or more machine learning modules as described in this disclosure.

With continued reference to FIG. 1, flight controller 120 is configured to generate torque percentage datum 140. A "torque percentage datum", for the purposes of this disclosure, is an element of data representing the actual torque produced by at least a propulsor compared to the modeled torque output of the same ideal propulsor given the same performance parameters. For example, in a nonlimiting embodiment, flight controller 120 may generate torque percentage datum 140 by dividing output torque datum 116 by model torque datum 132, wherein output torque datum 116 is detected by sensor 112 from propulsor 104 and model torque datum 132 generated from receiving ideal propulsor model 124. Performance parameter 128 would replicate the conditions that propulsor 104 is operating under. For example, in a nonlimiting embodiment, performance parameter 128 would include air density, temperature, humidity, propulsor type and electrical input that match exactly values the actual aircraft is operating under, and therefore model torque datum 132 would represent an ideal propulsor in those conditions. Torque percentage datum 140, in other words, would represent the torque output of an actual propulsor versus the same propulsor in an ideal world, giving way to a percentage of ideal torque. Torque percentage datum 140 may be represented as a fraction, percentage, decimal, or other mathematical representation of part of a whole. One of ordinary skill in the art, after reviewing the entirety of this disclosure would appreciate that there are virtually limitless visual, auditory, haptic or other types of representations that torque percentage datum 140 may take.

With continued reference to FIG. 1, flight controller 120 is configured to determine at least an obstruction datum 144 correlated to at least a performance parameter 128. An "obstruction datum", for the purposes of this disclosure, is an element of data representing an obstruction within propulsor 104 or related systems. Obstruction datum 140 may be the reason torque percentage datum 140 is generated. For example, in a nonlimiting embodiment, obstruction datum 144 may include loss of magnetization of an electric motor, leading to torque loss, and lowering torque percentage datum 140. Obstruction datum 144 may include one or more system malfunctions. Without limitation, in embodiments, obstruction datum 144 may include transient voltage, voltage imbalance, harmonic distortions, reflections on drive output PWM signals, sigma current, operational overloads, misalignments, shaft imbalances, shaft looseness, bearing wear, component wearing, cracks, component strains and stresses, shaft voltage, exposure to contaminants, power surges, supply increase or decrease, excessive humidity, over lubrication, under lubrication, and degradation of motor winding insulation, among others. One of ordinary skill in the art, after reviewing the entirety of this disclosure would appreciate that although the foregoing have been examples of obstruction datum 144 directed at electric propulsors, any type of propulsor may be used with unique obstruction datum 144 not listed here. Flight controller 120 may be configured to determine at least an obstruction datum 144 as a function of one or more machine-learning processes consistent with the entirety of this disclosure. Algorithms and machine-learning processes may include any algorithms or machine-learning processes as described herein. Training data may be columns, matrices, rows, blocks, spreadsheets, books, or other suitable datastores or structures that contain correlations between torque measurements to obstruction datums. Training data may be any training data as described below. Training data may be past measurements detected by any sensors described herein or another sensor or suite of sensors in combination. Training data may be detected by onboard or offboard instrumentation designed to detect torque and obstruction datums as described herein. Training data may be uploaded, downloaded, and/or retrieved from a server prior to flight. Training data may be generated by a computing device that may simulate torque outputs and correlated performance parameters suitable for use by the flight controller 120 in an embodiment of the present invention. Flight controller 120 and/or another computing device as described in this disclosure may train one or more machine-learning models using the training data as described in this disclosure. Training one or more machine-learning models consistent with the training one or more machine learning modules as described in this disclosure.

With continued reference to FIG. 1, flight controller 120 is configured to display torque percentage datum 140 and obstruction datum 144 to pilot, user, personnel, support staff, artificial intelligence, or the like at display 144. Display 144 may include a graphical user interface (GUI), multi-functional display (MFD), primary flight display (PFD), gages, dials, screens, touch screens, speakers, haptic feedback device, combination thereof, or another display type not listed here. In a nonlimiting embodiment, display 144 may include a mobile computing device like a smartphone, tablet, computer, laptop, client device, server, a combination thereof, or another undisclosed display alone or in combination. Display 144 may be disposed in at least a portion of a cockpit of an electric aircraft. Display 144 may be a heads-up display (HUD) disposed in goggles, glasses, eye screen, or other headwear a pilot or user may be wearing. Display 144 may include augmented reality, virtual reality, or combination thereof.

Figure 2:
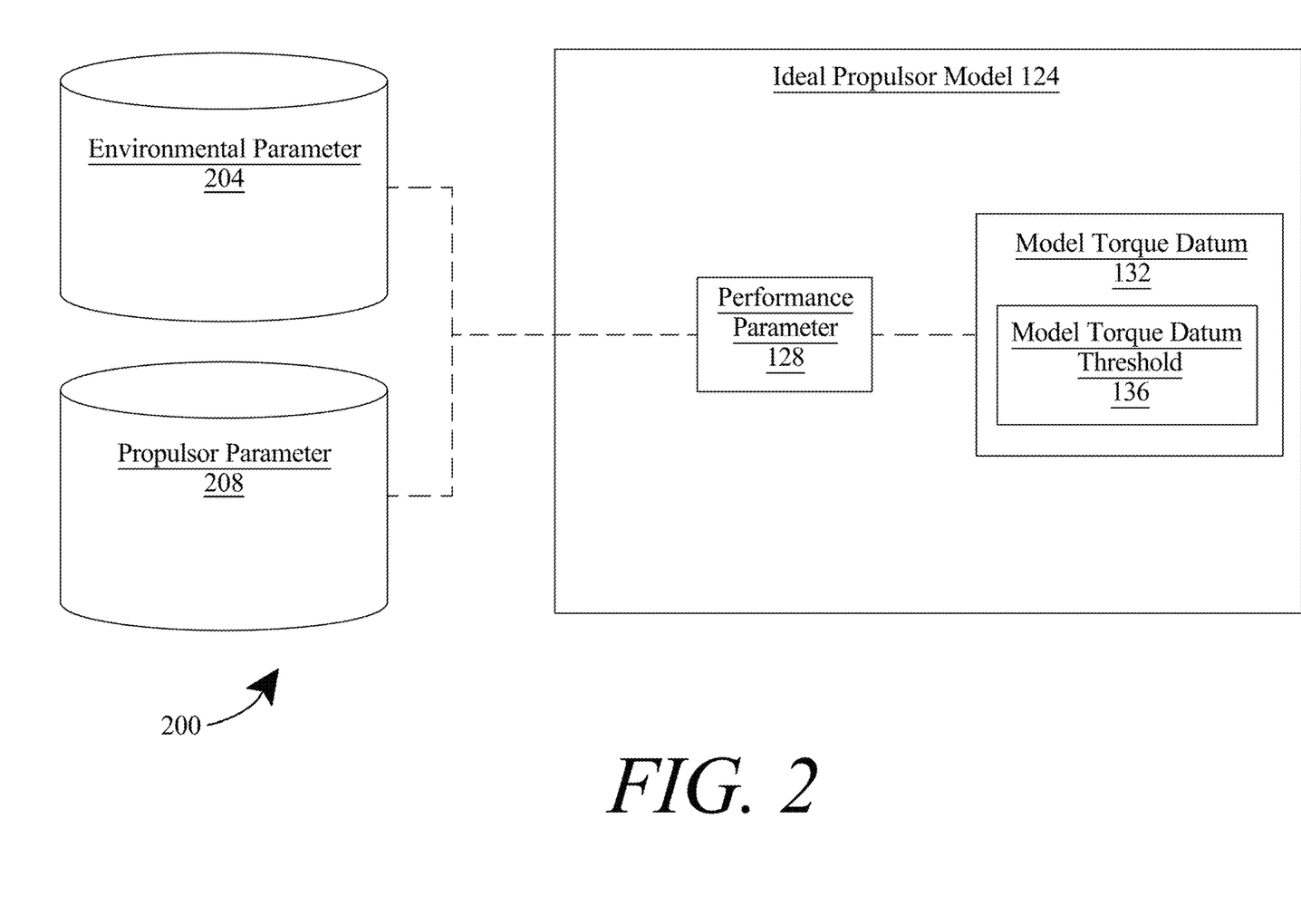
FIG. 2 is an exemplary embodiment of an ideal propulsor model presented in block diagram form.

Referring now to FIG. 2, exemplary embodiment 200 is illustrated including ideal propulsor model 124. Ideal propulsor model 124 may be any ideal propulsor model as disclosed herein. Ideal propulsor model may include one or more databases, workbooks, scripts, programs, codes, spreadsheets, list of steps, or other instructions disposed within a computing device configured to take inputs or otherwise include performance parameter 128 and generate model torque datum 132 and model torque datum threshold 136. In a nonlimiting embodiment, ideal propulsor model 124 may do the necessary processing to generate model torque datum 132. In another nonlimiting embodiment, flight controller 120 may be configured to generate model torque datum 132 as a function of receiving ideal propulsor model 124. Model torque datum 132 may be any model torque datum as disclosed herein. Model torque datum threshold 136 may include maximum and minimum values as disclosed herein. Model torque datum threshold 136 may be configured to trigger detection of obstruction datum 144. For example, in nonlimiting embodiments, torque percentage datum 140 may be calculated by flight controller 120 as a function of output torque datum 116 and model torque datum 132. Since model torque datum 132 includes model torque datum threshold 136, flight controller 120 may be configured to detect that output torque datum 116 was less than a minimum or greater than a maximum torque value associated with model torque datum 132 and alert a pilot or user to this, adjust aircraft controls, adjust propulsor controls, or trigger detection of obstruction datum 144 to assess the cause of the lower or higher torque value.

With continued reference to FIG. 2, exemplary embodiment 200 may include performance parameter 128. Performance parameter 128 may be any performance parameter as disclosed herein. Performance parameter 128 may include environmental parameter 104. Environmental parameter may be any environmentally based performance parameter as disclosed herein. Environment parameter 204 may include, without limitation, time, pressure, temperature, air density, altitude, gravity, humidity level, airspeed, angle of attack, and debris, among others. Environmental parameters 204 may be stored in any suitable datastore consistent with this disclosure. Environmental parameters 204 may include latitude and longitude, as well as any other environmental condition that may affect propulsor 104 performance. Performance parameter 128 may include propulsor parameter 208. Propulsor parameter 208 may be any propulsor parameter as disclosed herein. Propulsor parameter 208 may include propulsor type, size, specifications, material selection, weight, orientation, friction, lubrication, component and subsystem characteristics, electrical load, fuel type, wear, fatigue, stress, strain, or any other parameter that may affect a propulsor's ability to output torque. One of ordinary skill in the art, after reviewing the entirety of this disclosure, would appreciate the propulsor parameters associated with every propulsor type, and these examples in no way limit the plurality of values that propulsor parameter 208 may take. Propulsor parameter 208 may be stored in any suitable datastore consistent with the disclosure.

Figure 3:
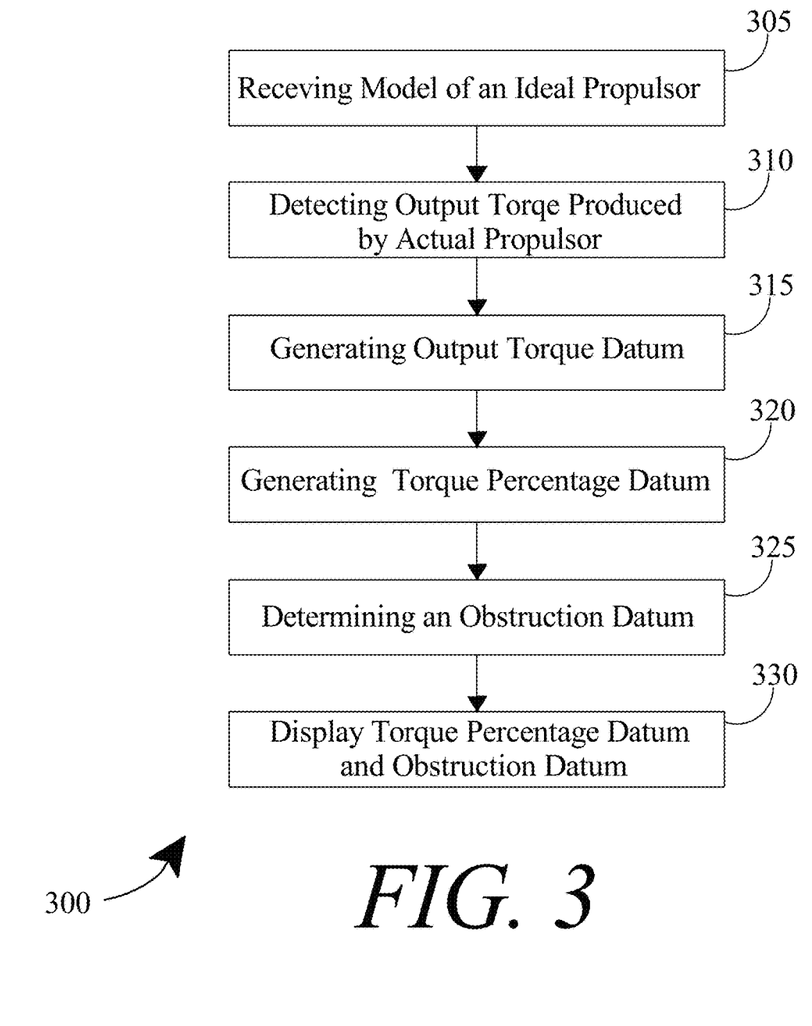
FIG. 3 is an exemplary method of estimating torque produced by a propulsor configured for use in an electric aircraft presented in process flow diagram form.

Referring now to FIG. 3, a method 300 of estimating the percentage torque produced by a propulsor configured for use in electric aircraft is illustrated in a process flow diagram. At 305, method 300 includes receiving an ideal propulsor model. Ideal propulsor model 124 may be any ideal propulsor model as disclosed herein. Ideal propulsor model 14 may include at least a performance parameter 128. Performance parameter 128 may be any performance parameter 128 as disclosed herein. Performance parameter 128 may include an environmental parameter. Environmental parameter 204 may be any environmental parameter as disclosed herein. Performance parameter 128 may include a propulsor parameter 208. Propulsor parameter 208 may include any propulsor parameter as disclosed herein. Ideal propulsor model 120 includes model torque datum 132. Model torque datum 132 may include any model torque datum 132 as disclosed herein. Flight controller 120 may utilize stored data to generate model torque datum 132. Stored data may be any stored data as described herein. Ideal propulsor model 124 may include model torque datum threshold 136. Model torque datum threshold 136 may be any model torque datum threshold as disclosed herein. Ideal propulsor model 124 may be a model of an electric motor. Ideal propulsor model may be a model of a propeller. One of ordinary skill in the art would appreciate, after reviewing the entirety of this disclosure, the plurality of propulsors that ideal propulsor model 124 may be a virtual representation of.

With continued reference to FIG. 3, at step 310, method 300 includes detecting output torque 108 produced by propulsor 104. Output torque 108 may be any output torque as described herein. Propulsor 104 may be any propulsor as described herein. The propulsor may be mechanically and electrically coupled to an electric aircraft. Propulsor 104 may include a sensor 112 to detect output torque 108. Sensor 112 may be any sensor or grouping of sensors as described herein. Sensor 112 may include one or more motion sensors. Sensor 112 may include a sensor suite including multiple individual sensors. Sensor suite may be any sensor suite as described herein.

At step 315, method 300 include generating an output torque datum 116 as a function of the detection of output torque 108. Output torque datum 116 may be any output torque datum as described herein.

At step 320, method 300 includes generating torque percentage datum 140 as a function of output datum 116 and model torque datum 132. Output datum 116 may be any output datum as described herein. Model torque datum 132 may be any model torque datum as described herein.

At step 325, method 300 includes determining obstruction datum 144 correlated to the torque percentage datum 140. Obstruction datum 144 may be any obstruction datum as described herein. Torque percentage datum 140 may be any torque percentage datum as described herein. Obstruction datum 144 may include a system malfunction. Method 300 may include one or more machine-learning processes to determine the obstruction datum 144.

At step 330, method 300 includes displaying torque percentage datum 140 and obstruction datum 144. Torque percentage datum 140 may be any torque percentage datum as described herein. Obstruction datum 144 may be any obstruction datum as described herein.

Figure 4:
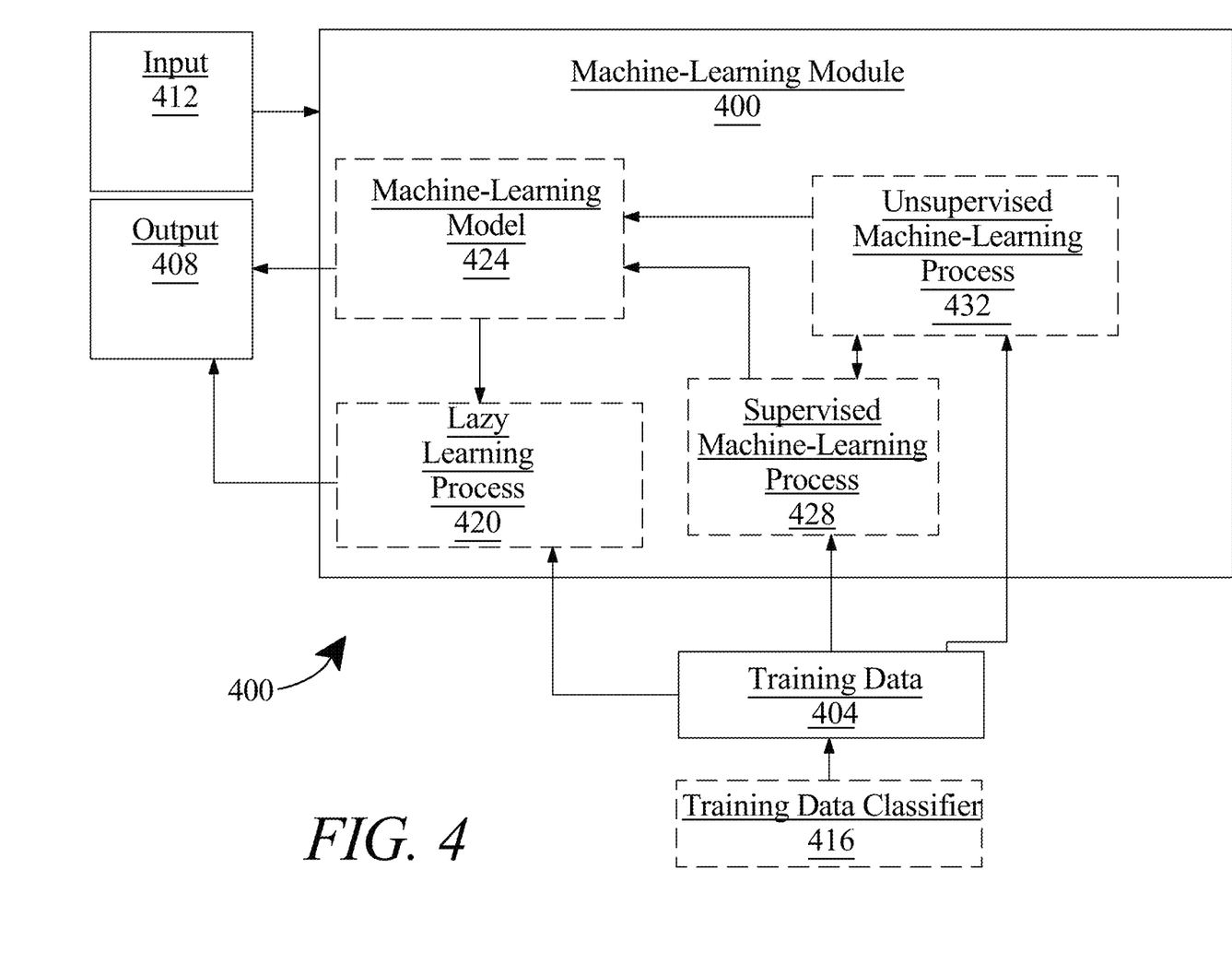
FIG. 4 is a block diagram of an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example at least a performance parameter 128 may be input, wherein a model torque datum 132 and model torque datum threshold 136 are outputted.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to classes of deficiencies, wherein a nourishment deficiency may be categorized to a large deficiency, a medium deficiency, and/or a small deficiency.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include at least a performance parameter 128 as described above as one or more inputs, model torque datum 132 and model torque datum threshold 136 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
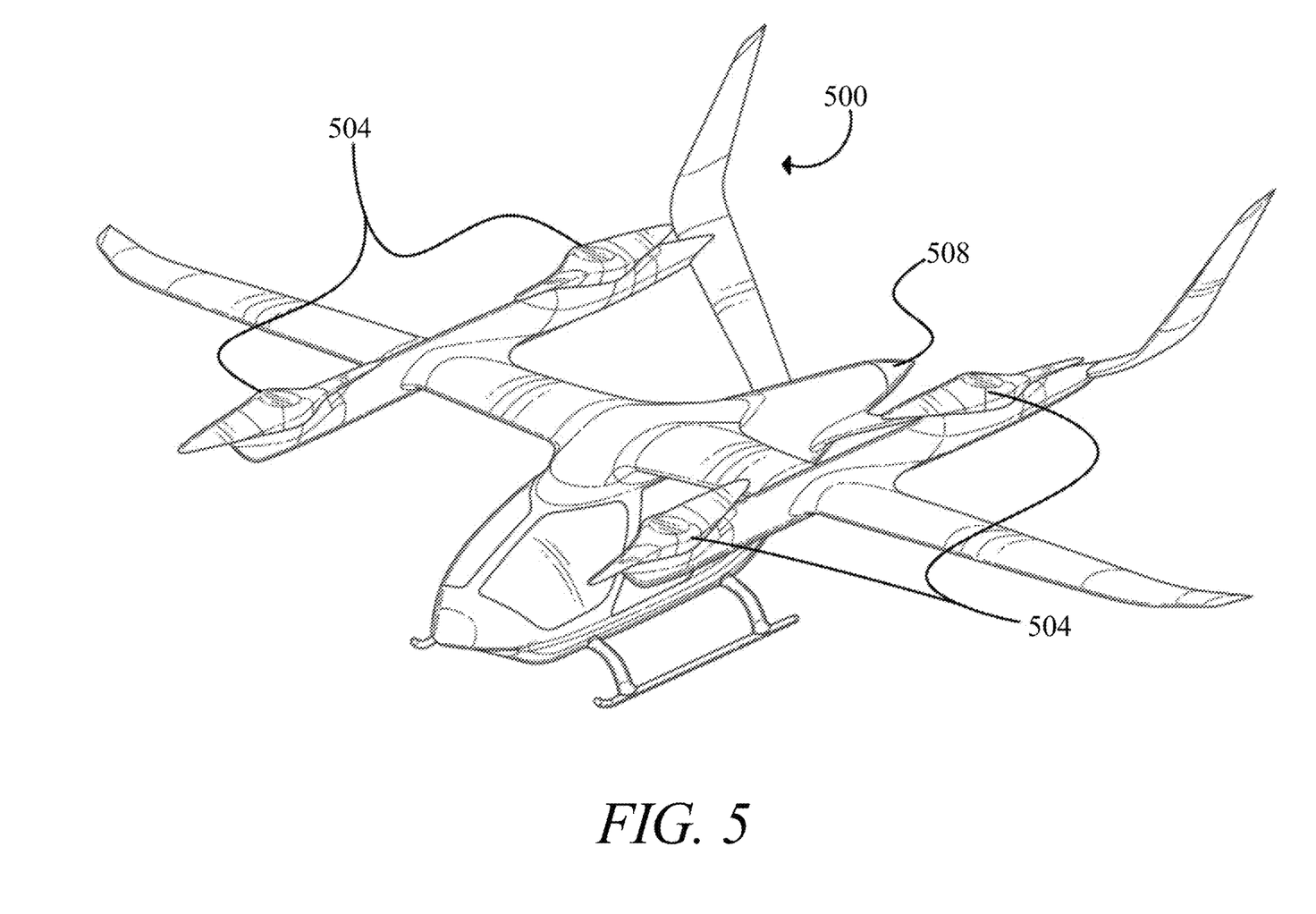
FIG. 5 is an illustration of an embodiment of an electric aircraft.

Referring now to FIG. 5, an embodiment of an electric aircraft 500 is presented. Still referring to FIG. 5, electric aircraft 500 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 5, a number of aerodynamic forces may act upon the electric aircraft 500 during flight. Forces acting on an electric aircraft 500 during flight may include, without limitation, thrust, the forward force produced by the rotating element of the electric aircraft 500 and acts parallel to the longitudinal axis. Another force acting upon electric aircraft 500 may be, without limitation, drag, which may be defined as a rearward retarding force which is caused by disruption of airflow by any protruding surface of the electric aircraft 500 such as, without limitation, the wing, rotor, and fuselage. Drag may oppose thrust and acts rearward parallel to the relative wind. A further force acting upon electric aircraft 500 may include, without limitation, weight, which may include a combined load of the electric aircraft 500 itself, crew, baggage, and/or fuel. Weight may pull electric aircraft 500 downward due to the force of gravity. An additional force acting on electric aircraft 500 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 500 are designed to be as lightweight as possible. Reducing the weight of the aircraft and designing to reduce the number of components is essential to optimize the weight. To save energy, it may be useful to reduce weight of components of an electric aircraft 500, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 500 and/or propulsors.

Referring still to FIG. 5, Aircraft may include at least a vertical propulsor 504 and at least a forward propulsor 508. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in a upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 504 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 5, at least a forward propulsor 508 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 504 and at least a forward propulsor 508 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 5, during flight, a number of forces may act upon the electric aircraft. Forces acting on an aircraft 500 during flight may include thrust, the forward force produced by the rotating element of the aircraft 500 and acts parallel to the longitudinal axis. Drag may be defined as a rearward retarding force which is caused by disruption of airflow by any protruding surface of the aircraft 500 such as, without limitation, the wing, rotor, and fuselage. Drag may oppose thrust and acts rearward parallel to the relative wind. Another force acting on aircraft 500 may include weight, which may include a combined load of the aircraft 500 itself, crew, baggage and fuel. Weight may pull aircraft 500 downward due to the force of gravity. An additional force acting on aircraft 500 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
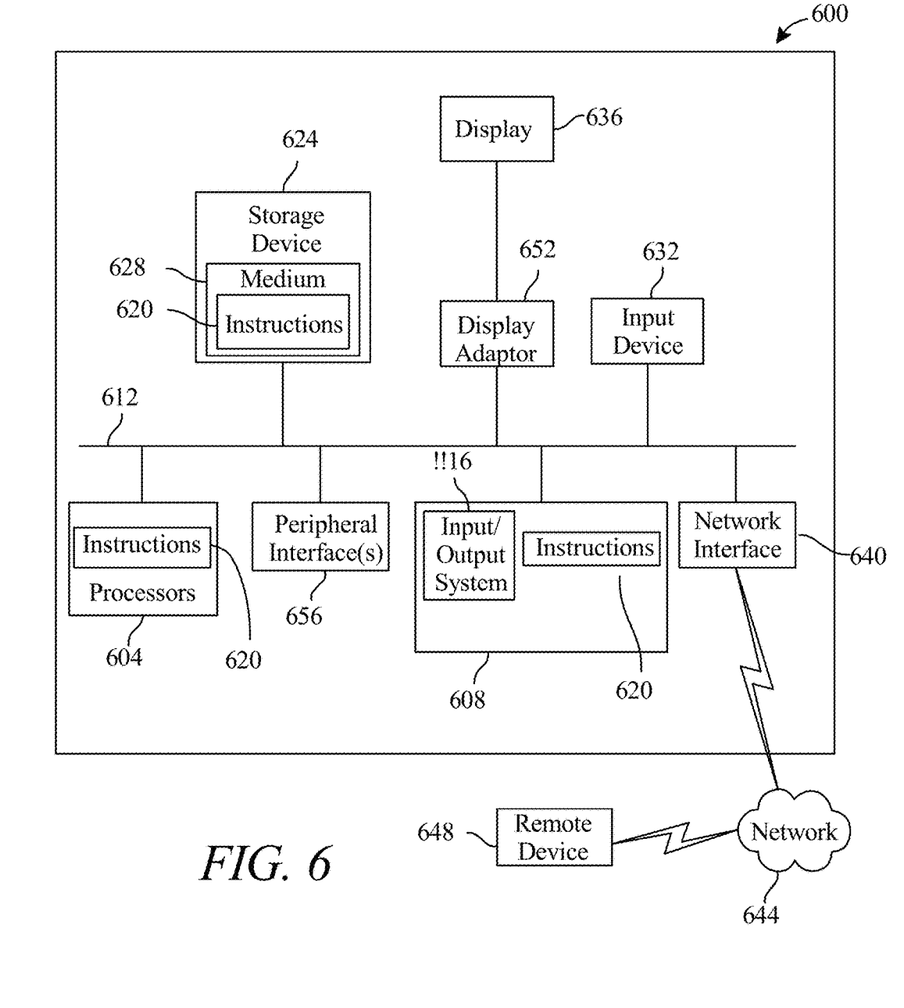
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for estimating percentage torque produced by a propulsor configured for use in an electric aircraft, the system comprising:
   a propulsor, the propulsor configured to generate output torque;
   a sensor, the sensor configured to:
      detect the output torque; and
      generate an output torque datum;
   a flight controller, the flight controller including a computing device, the computing device configured to:
      receive an output torque datum;
      receive an ideal propulsor model, the ideal propulsor model including at least a performance parameter;
      generate a model torque datum, including a model torque datum threshold, as a function of the at least a performance parameter;
      generate a torque percentage datum as a function of the output torque datum and model torque datum; and
      determine, at least an obstruction datum correlated to the torque percentage datum;
      display torque percentage datum and the at least an obstruction datum.

2. The system of claim 1, wherein the propulsor comprises an electric motor.

3. The system of claim 1, wherein the propulsor comprises a propeller.

4. The system of claim 1, wherein the sensor comprises a motion sensor.

5. The system of claim 1, wherein the sensor comprises a sensor suite further comprising a plurality of individual sensors.

6. The system of claim 1, wherein the flight controller utilizes stored data to generate model torque datum.

7. The system of claim 1, wherein at least a performance parameter includes at least an environmental parameter.

8. The system of claim 1, wherein at least a performance parameter includes at least a propulsor parameter.

9. The system of claim 1, wherein the at least an obstruction datum includes a system malfunction.

10. The system of claim 1, wherein the flight controller is configured to determine the at least an obstruction datum as a function of a machine-learning process.

11. A method of estimating the percentage torque produced by a propulsor configured for use in an electric aircraft, the method comprising:
   receiving a model of an ideal propulsor, wherein:
      the ideal propulsor model includes at least performance parameter;
      the ideal propulsor model includes a model torque datum; and
      the ideal propulsor model includes a model torque datum threshold;
   detecting output torque produced by a propulsor, wherein:
      the propulsor is mechanically and electrically coupled to at least a portion of the electric aircraft;
      the actual propulsor comprises a sensor configured to detect output torque;
   generating an output torque datum as a function of the detection of the output torque;
   generating a torque percentage datum as a function of the output torque datum and the model torque datum;
   determining an obstruction datum correlated to the torque percentage datum; and
   displaying the torque percentage datum and obstruction datum.

12. The method of claim 1, wherein the propulsor comprises an electric motor.

13. The method of claim 1, wherein the propulsor comprises a propeller.

14. The method of claim 1, wherein the sensor comprises a motion sensor.

15. The method of claim 1, wherein the sensor comprises a sensor suite further comprising multiple individual sensors.

16. The method of claim 1, wherein the flight controller utilizes stored data to determine model torque datum.

17. The method of claim 1, wherein at least a performance parameter includes environmental parameters.

18. The method of claim 1, wherein at least a performance parameter includes propulsor parameters.

19. The method of claim 1, wherein the at least an obstruction datum includes a system malfunction.

20. The method of claim 1, wherein the flight controller is configured to determine the at least an obstruction datum as a function of a machine-learning process.

* * * * *